(12) United States Patent
Poosa et al.

(10) Patent No.: US 12,514,141 B2
(45) Date of Patent: Jan. 6, 2026

(54) SYSTEM AND METHOD FOR DETERMINING FRAME POSITION OF AN AGRICULTURAL IMPLEMENT

(71) Applicant: CNH Industrial America LLC, New Holland, PA (US)

(72) Inventors: Sai Raghavendra Prasad Poosa, Darien, IL (US); Surya Saket Dasika, Lombard, IL (US); Michael R. Cozza, Pittsburgh, PA (US); Thamer Z. Alharbi, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 1057 days.

(21) Appl. No.: 17/551,941

(22) Filed: Dec. 15, 2021

(65) Prior Publication Data

US 2023/0180650 A1 Jun. 15, 2023

(51) Int. Cl.
*A01B 76/00* (2006.01)
*A01B 63/00* (2006.01)
*A01B 63/16* (2006.01)
*A01B 63/111* (2006.01)
*G01S 17/08* (2006.01)
*G01S 17/42* (2006.01)

(52) U.S. Cl.
CPC ............ *A01B 63/002* (2013.01); *A01B 63/16* (2013.01); *A01B 63/1112* (2013.01); *A01B 76/00* (2013.01); *G01S 17/08* (2013.01); *G01S 17/42* (2013.01)

(58) Field of Classification Search
CPC ..... A01D 41/141; G01S 17/08; A01B 63/002; A01B 63/1112; A01B 76/00
See application file for complete search history.

(56) References Cited

U.S. PATENT DOCUMENTS

| 7,209,221 B2 | 4/2007 | Breed et al. |
| 11,737,385 B2* | 8/2023 | Sporrer ............... A01B 63/1112 701/50 |
| 2018/0153088 A1* | 6/2018 | Sporrer ............... A01B 49/065 |
| 2018/0271016 A1* | 9/2018 | Milano .................. A01D 33/14 |
| 2020/0116479 A1 | 4/2020 | Shearer et al. |
| 2020/0236835 A1* | 7/2020 | Stanhope ............. A01B 79/005 |
| 2021/0024081 A1 | 1/2021 | Johnson-Roberson et al. |
| 2021/0029877 A1 | 2/2021 | Vandike et al. |
| 2021/0064037 A1 | 3/2021 | Boutaud et al. |

(Continued)

FOREIGN PATENT DOCUMENTS

| DE | 102018102361 A1 | 8/2019 |
| DE | 102018216547 A1 | 4/2020 |
| WO | WO 2020/037003 A1 | 2/2020 |

*Primary Examiner* — Adam J Behrens
(74) *Attorney, Agent, or Firm* — Dority & Manning, P.A.

(57) ABSTRACT

An agricultural implement includes a sensor supported on the frame. The sensor, in turn, is configured to emit output signals for refection off of a field surface of a field and detect reflections of the output signals as return signals. Moreover, the agricultural implement includes a computing system communicatively coupled to the sensor. In this respect, the computing system configured to receive data associated with the detected reflections from the sensor and fit a line or plane to received data. In addition, the computing system is configured to determine at least one of an orientation of the frame or a distance between the frame and the field surface based on the fitted line or plane.

18 Claims, 6 Drawing Sheets

(56) References Cited

U.S. PATENT DOCUMENTS

2021/0068331 A1\* 3/2021 Sporrer ................. A01B 63/16
2021/0100155 A1\* 4/2021 Vandeven .............. A01D 47/00
2024/0306627 A1\* 9/2024 Tanner ................ A01M 7/0089

\* cited by examiner

SYSTEM AND METHOD FOR DETERMINING FRAME POSITION OF AN AGRICULTURAL IMPLEMENT

FIELD OF THE INVENTION

The present disclosure generally relates to agricultural implements and, more particularly, to systems and methods for determining frame position of an agricultural implement.

BACKGROUND OF THE INVENTION

It is well known that, to attain the best agricultural performance from a field, a farmer must occasionally cultivate the soil, typically through a tillage operation. Modern farmers perform tillage operations by pulling a tillage implement behind an agricultural work vehicle, such as a tractor. As such, tillage implements generally include a plurality of ground-engaging tools configured to penetrate the soil to a particular depth. The ground-engaging tools may be spaced apart from each other on the frame of the implement to provide uniform tilling to the swath of the field over which the implement is towed.

When performing a tillage operation, it is desirable to create a level and uniform layer of tilled soil across the field to form a proper seedbed for subsequent planting operations. However, variations in the operating parameters of the implement and/or the soil conditions within the field may cause the implement frame to pitch, roll, or even bounce during operation. When the frame does not have a generally constant and level orientation relative to the field surface, the ground-engaging tools may penetrate the soil to varying depths, thereby resulting in an uneven seedbed. Such poor seedbed conditions can result in a subsequent loss in the crop yield, such as due to poor germination and/or non-uniform plant stands. In this respect, systems have been developed to monitor the orientation of the frame of an agricultural implement during operation. While these systems work well, further improvements are needed.

Accordingly, an improved system and method for determining frame orientation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a frame extending in a longitudinal direction between a forward end of the frame and an aft end of the frame. The frame further extends in a lateral direction between a first side of the frame and a second side of the frame. Furthermore, the agricultural implement includes a tool supported on the frame, with the tool configured to perform an agricultural operation on a field as the agricultural implement travels across the field. Additionally, the agricultural implement includes a sensor supported on the frame. The sensor, in turn, is configured to emit output signals for reflection off of a field surface of the field and detect reflections of the output signals as return signals. Moreover, the agricultural implement includes a computing system communicatively coupled to the sensor. In this respect, the computing system is configured to receive data associated with the detected reflections from the sensor and fit a line or plane to received data. In addition, the computing system is configured to determine at least one of an orientation of the frame or a distance between the frame and the field surface based on the fitted line or plane.

In another aspect, the present subject matter is directed to a system for monitoring frame orientation of an agricultural implement. The system includes an implement frame extending in a longitudinal direction between a forward end of the implement frame and an aft end of the implement frame. The implement frame further extends in a lateral direction between a first side of the implement frame and a second side of the implement frame. Furthermore, the agricultural implement includes a sensor supported on the implement frame. The sensor, in turn, is configured to emit output signals for reflection off of a field surface of the field and detect reflections of the output signals as return signals. Additionally, the agricultural implement includes a computing system communicatively coupled to the sensor. In this respect, the computing system is configured to receive data associated with the detected reflections from the sensor and fit a line or plane to received data. Moreover, the computing system is configured to determine at least one of an orientation of the frame or a distance between the frame and the field surface based on the fitted line or plane.

In a further aspect, the present subject matter is directed to a method for monitoring frame orientation of an agricultural implement. The agricultural implement, in turn, includes a frame. The method includes receiving, with a computing system, data from a sensor supported on the frame, with the sensor configured to emit output signals for reflection off of a field surface of a field and detect reflections of the output signals as return signals. In addition, the method includes fitting, with the computing system, a line or plane to received data and determining, with the computing system, at least one of an orientation of the frame or a distance between the frame and the field surface based on the fitted line or plane. Furthermore, the method includes comparing, with the computing system, the determined at least one of the orientation or the distance to an associated predetermined range. Additionally, when the determined at least one of the orientation or the distance falls outside of the associated predetermined range, the method includes initiating, with the computing system, a control action.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring frame position of an agricultural implement. As will be described below, the agricultural implement includes a frame extending in a longitudinal direction between its forward and aft ends and in a lateral direction between its first and second sides. Variations in implement operating parameters (e.g., tire pressures) and/or field conditions (e.g., soil moisture) may cause the frame to pitch, roll, or even bounce as the implement travels across the field. Specifically, the frame has a pitched orientation when its forward and aft ends are at different heights relative to the field surface. Conversely, when its first and second sides are at different heights relative to the field surface, the frame has a rolled orientation.

In several embodiments, a computing system of the disclosed system may determine the position of the frame based on data received from a sensor supported thereon. Specifically, as the implement travels across the field, the sensor emits output signals for reflection off of the field surface and detects reflections of the output signals as return signals. For example, in one embodiment, the sensor may be configured as a LiDAR sensor. In this respect, the computing system receives data associated with the detected reflections from the sensor and fits a line to received data (e.g., when the sensor is a 2D sensor) or a plane to the received data (e.g., when the sensor is a 3D sensor). Thereafter, the computing system may determine the orientation of the implement frame (e.g., its pitch angle, its roll angle) and/or the distance between the implement frame and the field surface based on the fitted line or plane. For example, the computing system may determine the orientation of the implement frame based on the angle defined between the fitted line or plane and the horizontal axis of the frame. Conversely, the computing system may determine the distance between the implement frame and the field surface based on the fitted line or plane based on the distance between a center point of the fitted line or plane and the sensor.

The disclosed system and method improve the operation of the agricultural implement. More specifically, current systems rely on inertial measurement units (IMUs) to determine frame orientation. However, many IMUs can only detect angular rates (e.g., the angular speed of the frame), not angular positions (e.g., the angle of the frame relative to the field surface). In this respect, to determine the orientation of the frame based on such IMU data, the angular speed detected by the IMU must be integrated, which requires significant computing resources. Moreover, such operation requires estimating a constant of integration, which is prone to large errors. Some IMUs have linear accelerometers that can measure angular position relative to gravity. However, the field surface is not always level so measuring angular position relative to gravity is not as accurate as measuring relative to the ground plane when trying to determine proper leveling of the implement. Additionally, IMUs typically have a lot of noise present in the signal, thereby requiting that the measurements be averaged over many seconds. Furthermore, IMUs can only detect orientation with respect to gravity, not with respect to a local ground plane. Thus, IMUs are ineffective on hills or side slopes in determining when the implement creating an even seed bed with respect to the ground plane. In addition, IMUs cannot distinguish the difference between an orientation angle caused by the implement running incorrectly and implement running correctly but being pulled uphill, downhill, or on a side slope parallel to the hill. However, as described above, the disclosed system and method rely on fitting a line or plane to received LiDAR sensor data and using the fitted line or plane to determine frame orientation. Thus, the disclosed system and method determine frame position more accurately, more quickly, and with fewer computing resources than conventional systems.

Figure 1:
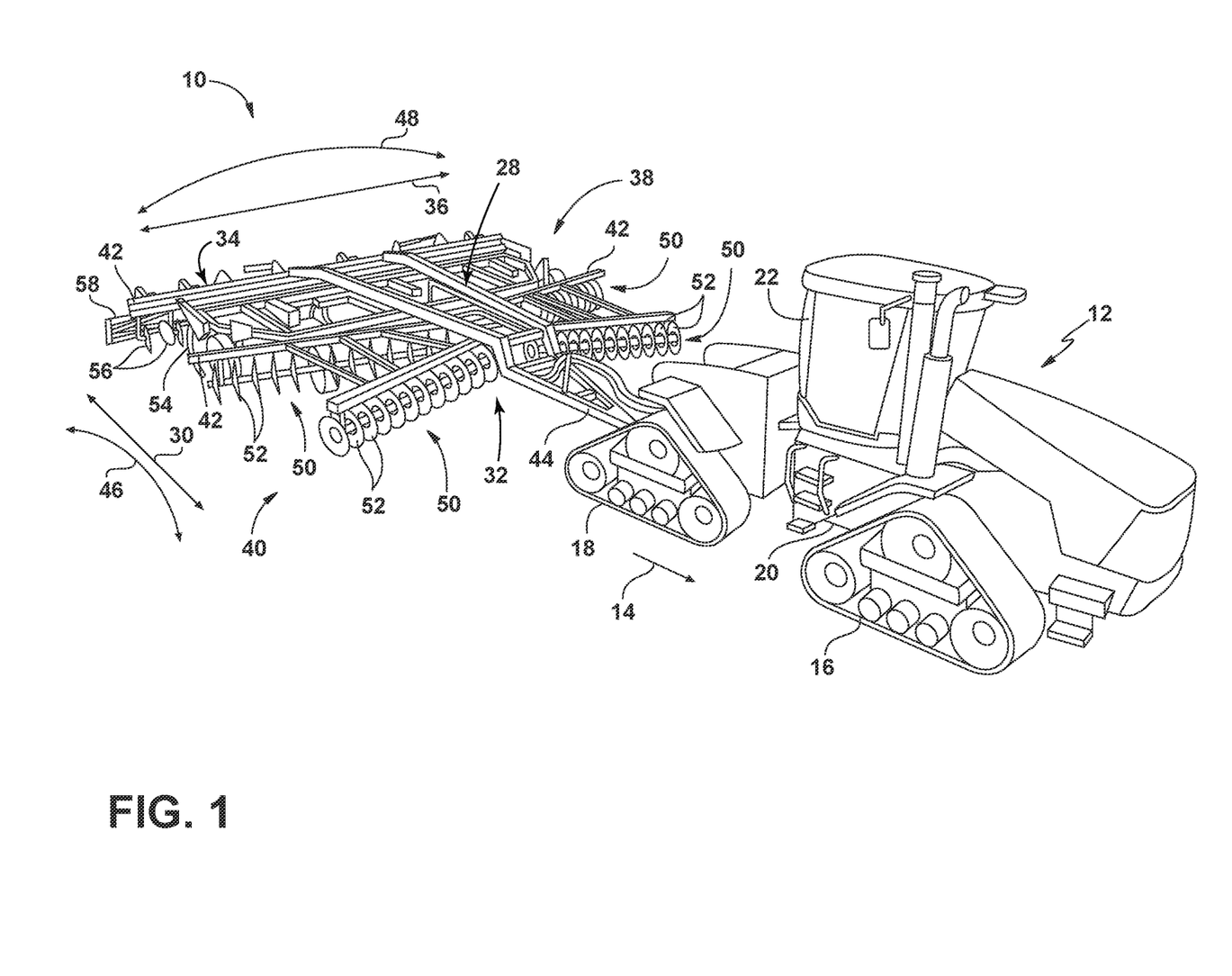
FIG. 1 illustrates a perspective view of one embodiment of an agricultural implement being towed by an associated work vehicle in accordance with aspects of the present subject matter.

Referring now to the drawings, FIG. 1 illustrates a perspective view of an agricultural implement 10 being towed by an associated work vehicle 12 across a field in a direction of travel (indicated by arrow 14). In the illustrated embodiment, the agricultural implement 10 is configured as a tillage implement (e.g., a disk ripper) and the work vehicle 12 is configured as an agricultural tractor. However, in alternative embodiments, the agricultural implement 10 may correspond to any other suitable type of agricultural implement (e.g., a seed-planting implement, a towable sprayer, etc.) and the work vehicle 12 may correspond to any other suitable type of vehicle (e.g., an agricultural harvester, a self-propelled sprayer, etc.).

As shown in FIG. 1, the vehicle 12 includes a pair of front track assemblies 16, a pair of rear track assemblies 18, and a frame or chassis 20 coupled to and supported by the track assemblies 16, 18. An operator's cab 22 may be supported, by a portion of the chassis 20 and may house various input devices for permitting an operator to control the operation of one or more components of the vehicle 12 and/or one or more components of the implement 10.

Additionally, as shown in FIG. 1, the implement 10 includes a frame 28. More specifically, the frame 28 extends in a longitudinal direction (indicated by arrow 30) between a forward end 32 of the frame 28 and an aft end 34 of the frame 28. Furthermore, the frame 28 also extends in a lateral direction (indicated by arrow 36) between a first side 38 of the frame 28 and a second side 40 of the frame 28. In this respect, the frame 28 generally includes a plurality of structural frame members 42, such as beams, bars, and/or the like, which are configured to support or couple to a plurality of components. For example, as will be described below, the frame 28 may be configured to support one or more tools configured to perform an agricultural operation on a field as the implement 10 travels across the field. Furthermore, a hitch assembly 44 may be connected to the frame 28 and configured to couple the implement 10 to the vehicle 12.

It is generally desirable that the frame 28 remains at a constant and level (or at least substantially constant and level) orientation relative to the field surface or ground. In general, the orientation of the frame 28 may be defined by the pitch of the frame 28 (indicated by arrow 46) and/or the roll of the frame 28 (indicated by arrow 48). More specifically, the pitch 46 of the frame 28 is the differential in the heights of the forward and aft ends 32, 34 of the frame 28 in the longitudinal direction 30 of the implement 10. That is, the frame 28 has a pitched orientation when one of the forward or aft ends 32, 34 of the frame 28 is closer to the ground than the other of forward or aft ends 32, 34 of the frame 28. Moreover, the roll 48 of the frame 28 is the differential in the heights of the first and second sides 38, 40 of the frame 28 in the lateral direction 36 of the implement 10. That is, the frame 28 has a rolled orientation when one of the first and second sides 38, 40 of the frame 28 is closer to the ground than the other of first and second sides 38, 40 of the frame 28.

As mentioned above, the frame 28 may support one or more tools configured to perform an agricultural operation (e.g., a tillage operation) on the field as the implement/vehicle 10/12 travels across the field in the direction of travel 14. For example, in several embodiments, the frame 28 may support one or more gangs or sets 50 of disk blades 52. Each disk blade 52 may, in turn, be configured to penetrate into or otherwise engage the soil as the implement 10 is pulled through the field. In this regard, the various disk gangs 50 may be oriented at an angle relative to the direction of travel 14 to promote more effective tilling of the soil. In the embodiment shown in FIG. 1, the implement 10 includes four disk gangs 50 supported on the frame 28 adjacent to its forward end 32. However, in alternative embodiments, the implement 10 may include any other suitable number of disk gangs 50. Furthermore, in one embodiment, the disk gangs 50 may be mounted to the frame 28 at any other suitable location, such as adjacent to its aft end 34.

Moreover, in several embodiments, the implement frame 28 may be configured to support other ground-engaging tools. For instance, in the illustrated embodiment, the frame 28 is configured to support a plurality of shanks 54 configured to rip or otherwise till the soil as the implement 10 is towed across the field. Furthermore, in the illustrated embodiment, the frame 28 is also configured to support a plurality of leveling blades 56 and a plurality of rolling (or crumbler) basket assemblies 58. However, in other embodiments, any other suitable ground-engaging tools may be coupled to and supported by the implement frame 28, such as a plurality closing disks.

It should be further appreciated that the configuration of the agricultural implement 10 and the associated work vehicle 12 described above and shown in FIGS. 1 is provided only to place the present subject matter in an exemplary field of use. Thus, it should be appreciated that the present subject matter may be readily adaptable to any manner of implement and/or vehicle configuration.

Figure 2:
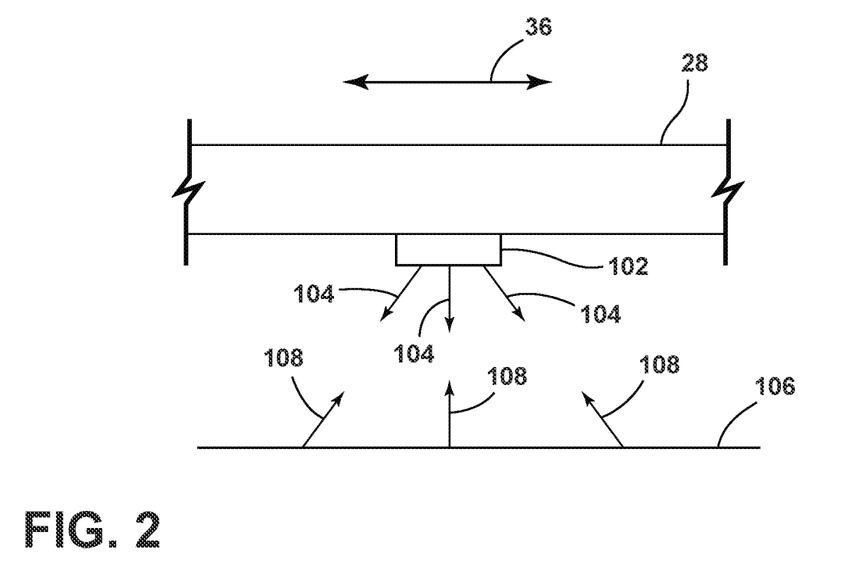
FIG. 2 illustrates a simplified front view of a sensor supported on a frame of an implement in accordance with aspects of the present subject matter, particularly illustrating the sensor when the frame has a generally level orientation.
Figure 3:
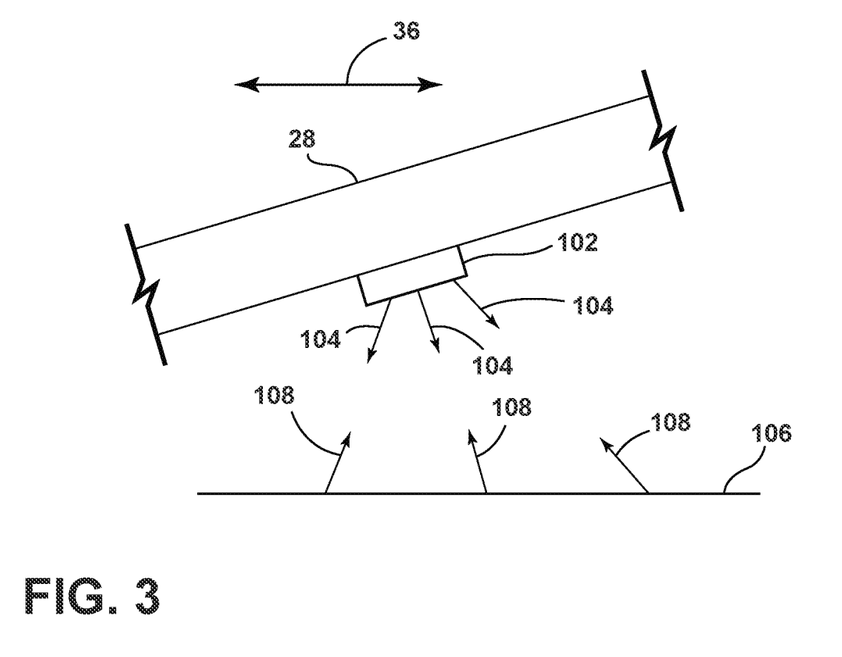
FIG. 3 illustrates a simplified front view of a sensor supported on a frame of an implement in accordance with aspects of the present subject matter, particularly illustrating the sensor when the frame has a rolled orientation.

FIGS. 2 and 3 illustrate differing simplified, front views of a sensor 102 supported on the frame 28 of the agricultural implement 10. More specifically, FIG. 2 illustrates the sensor 102 when the frame 28 has a generally level orientation relative to a field surface 106 of a field across which the implement 10 is traveling. Conversely, FIG. 3 illustrates the sensor 102 when the frame 28 has a generally rolled orientation relative to a field surface 106.

In general, as the implement/vehicle 10/12 travels across the field, the sensor 102 is configured to emit output signals (indicated by arrows 104) for reflection off of the field surface 106. Furthermore, the sensor 102 may detect the reflections of the output signals as return signals (indicated by arrows 108). Moreover, the sensor 102 may be configured to receive the reflected return signals 108. In this respect, and as will be described below, data indicative of the return signals is used to determine the position of the frame 28 (e.g., the orientation and/or height of the frame 28).

As shown in FIGS. 2 and 3, in several embodiments, the sensor 102 is configured to emit output signals 104. Specifically, in such embodiments, the output signals 104 are emitted that each output signal 104 is reflected off of the field surface 106 at a different location. For example, in the illustrated embodiment, each output signal 104 is reflected off of the field surface 106 at a different location along a swath of the field surface 106 extending in the lateral direction 36. However, in alternative embodiments, each output signal 104 is reflected off of the field surface 106 at a different location along a swath of the field surface 106 extending in the longitudinal direction 30. Additionally, although the sensor 102 is shown emitting three output signals 104 in FIGS. 2 and 3, the sensor 102 may emit any suitable number of output signals 104. For example, in some embodiments, the sensor 102 may emits several hundred or even several thousand output signals 104.

As mentioned above, the data captured by the sensor 102 is generally indicative of the position of the implement frame 28 relative to the field surface 106. More specifically, FIG. 2 illustrates the output signals 104 and the return signals 108 when the frame 28 is at a generally level orientation (e.g., generally parallel to the field surface 106). Conversely, FIG. 3 illustrates the output signals 104 and the return signals 108 when the frame 28 is at a generally rolled orientation in which one of the first or second sides 38, 40 of the frame 28 is closer to the field surface 106 than the other of the first or second sides 38, 40. As such, the data captured by the sensor 102 changes as the orientation and/height of the frame 28 changes, such as due to operating parameter variations (e.g., a flat tire or a tire pressure differential across the implement) or changes in field conditions (e.g., changes in soil moisture or soil hardness).

The sensor 102 may generally correspond to any suitable sensing device configured to function as described herein, such as by emitting output signals for reflection off of a field surface and by receiving or sensing the return signals. For example, the sensor 102 may be configured to scan light pulses from a light source (e.g., a laser outputting a puked laser beam) over a given swath of the field and detect the reflection of each pulse off the soil surface. Based on the time of flight of each light puke and angle at which such light pulse was emitted, the specific location (e.g., 2-D or 3-D coordinates) of the soil surface relative to the sensor 102 may be calculated. In some embodiments, the sensor 102 may be a 2D LiDAR sensor, such as a laser line scanner, configured to capture 2D scan line data. In other embodiments, the sensor 102 may be a 3D LiDAR sensor configured to capture 3D point cloud data. However, in alternative embodiments, the sensor 102 may correspond to a radio detection and ranging (RADAR) sensor, an ultrasonic sensor, a time-of-flight (TOF) camera, or any other suitable type of 2D or 3D sensor.

Moreover, the sensor 102 may be supported at any suitable location on the frame 28 of the implement 10. Additionally, the sensor 102 may be mounted directly on a frame member of the frame 28 such that all motion/movement of the frame is transmitted to the sensor 102. Alternatively, the sensor 102 may be coupled indirectly to the frame 28 via a mounting assembly (not shown) that provides some isolation from large shocks or sudden movement of the frame 28 (e.g., when a wheel of the implement 10 encounters a divot).

In addition, any suitable number of sensors 102 may be supported on the implement frame 28. For example, in the illustrated embodiment, a single sensor 102 is mounted on the frame 28. However, in alternative embodiments, the two or more sensor 102 may be mounted on the frame 28.

Figure 4:
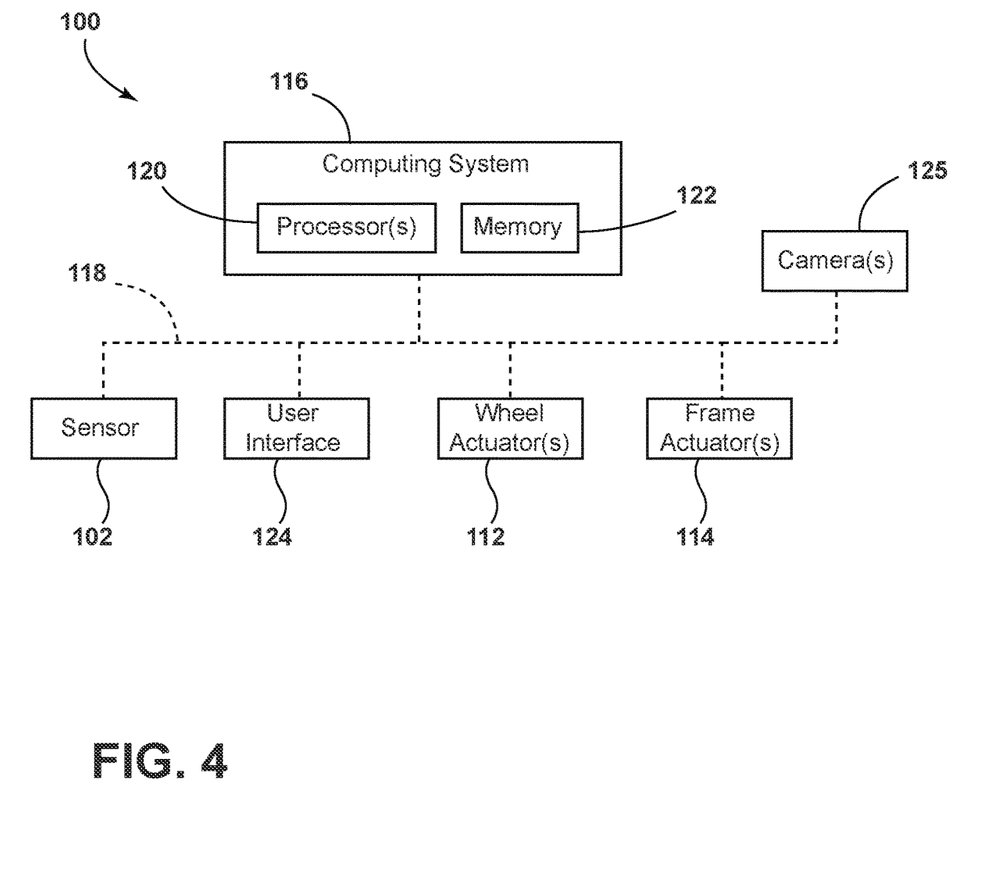
FIG. 4 illustrates a schematic view of one embodiment of a system for monitoring frame orientation of an agricultural implement in accordance with aspects of the present subject matter.

Referring now to FIG. 4, a schematic view of one embodiment of a system 100 for monitoring frame position of an agricultural implement is illustrated in accordance with aspects of the present subject matter. In general, the system 100 will be described herein with reference to the agricultural implement 10 and the associated work vehicle 12 described above with reference to FIGS. 1-3. However, it should be appreciated by those of ordinary skill in the art that the disclosed system 100 may generally be utilized with agricultural implements having any other suitable implement configuration and/or work vehicles having any other suitable vehicle configuration, As shown in FIG. 4, the system 100 includes one or more sensor(s) 102 supported on the frame 28 of the implement 10. Although the system 100 will generally be described in the context of using a single sensor 102, the system 100 may include additional sensors 102. In this respect, in some embodiments, data captured by multiple sensors 102 may be used to determine the position of the frame 28.

Furthermore, the system 100 may include one or more wheels actuators 112. Each wheel actuator 112 is, in turn, configured to adjust the position of an associated wheel (not shown) of the implement 10 relative to the frame 28 of the implement 10. By adjusting the relative positioning of the wheel and the frame 28, the height of the portion of the frame 28 to which the wheel is coupled can be adjusted. As such, the wheel actuator(s) 112 may correspond to any suitable type(s) of actuator(s), such as a fluid-driven actuator(s) (e.g., a hydraulic or pneumatic cylinder(s)), an electric linear actuator(s), and/or the like.

Additionally, the system 100 may include one or more frame actuators 114. Each frame actuator 114 is, in turn, configured to adjust the position of one section (not shown) of the frame 28 relative to another section (not shown) of the frame 28. By adjusting the relative positioning of a pair of frame section, the relative orientations of the frame sections can be adjusted. As such, the frame actuator(s) 114 may correspond to any suitable type(s) of actuator(s), such as a fluid-driven actuator(s) (e.g., a hydraulic or pneumatic cylinder(s)), an electric linear actuator(s), and/or the like.

Moreover, the system 100 may include any other suitable components. For example, in the illustrated embodiment, the system 100 includes one or more cameras 125 supported on the frame 28. Each camera 125 is, in turn, configured to capture images or other image data depicting the portion of the field within a camera frame as the implement/vehicle 10/12 travels across the field.

In addition, the system 100 includes a computing system 116 communicatively coupled to one or more components of the implement 10, the associated work vehicle 12, and/or the system 100 to allow the operation of such components to be electronically or automatically controlled by the computing system 116. For instance, the computing system 116 may be communicatively coupled to the sensor 102 via a communicative link 118. As such, the computing system 116 may be configured to receive data from the sensor 102 that is indicative of the orientation of the frame 28 of the implement 10. Furthermore, the computing system 116 may be communicatively coupled to the actuators 112, 114 via the communicative link 118. In this respect, the computing system 116 may be configured to control the operation of the actuators 112, 114 to adjust the relative positioning of various components of the implement 10, thereby adjusting the orientation of the frame 28. In addition, the computing system 116 may be communicatively coupled to any other suitable components of the implement 10, the work vehicle 12, and/or the system 100.

In general, the computing system 116 may comprise one or more processor-based devices, such as a given controller or computing device or any suitable combination of controllers or computing devices. Thus, in several embodiments, the computing system 116 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 122 of the computing system 116 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 122 may generally be configured to store suitable computer-readable instructions that, when implemented by the processor(s) 120, configure the computing system 116 to perform various computer-implemented functions, such as one or more aspects of the methods and algorithms that will be described herein. In addition, the computing system 116 may also include various other suitable components, such as a communications circuit or module, one or more input/output channels, a data/control bus and/or the like.

The various functions of the computing system 116 may be performed by a single processor-based device or may be distributed across any number of processor-based devices, in which instance such devices may be considered to form part of the computing system 116. For instance, the functions of the computing system 116 may be distributed across multiple application-specific controllers or computing devices, such as a navigation controller, an engine controller, a transmission controller, an implement controller, an onboard controller of the sensor 102, and/or the like.

In addition, the system 100 may also include a user interface 124. More specifically, the user interface 124 may be configured to provide feedback from the computing system 116 (e.g., feedback associated with the orientation of the implement frame 28) to the operator. As such, the user interface 124 may include one or more feedback devices (not shown), such as display screens, speakers, warning lights, and/or the like, which are configured to provide feedback from the computing system 116 to the operator. As such, the user interface 124 may, in turn, be communicatively coupled to the computing system 116 via the communicative link 118 to permit the feedback to be transmitted from the computing system 116 to the user interface 124. Furthermore, some embodiments of the user interface 124 may include one or more input devices, such as touchscreens, keypads, touchpads, knobs, buttons, sliders, switches, mice, microphones, and/or the like, which are configured to receive inputs from the operator. In one embodiment, the user interface 124 may be mounted or otherwise positioned within the cab 22 of the work vehicle 12. However, in alternative embodiments, the user interface 124 may mounted at any other suitable location.

Figure 5:
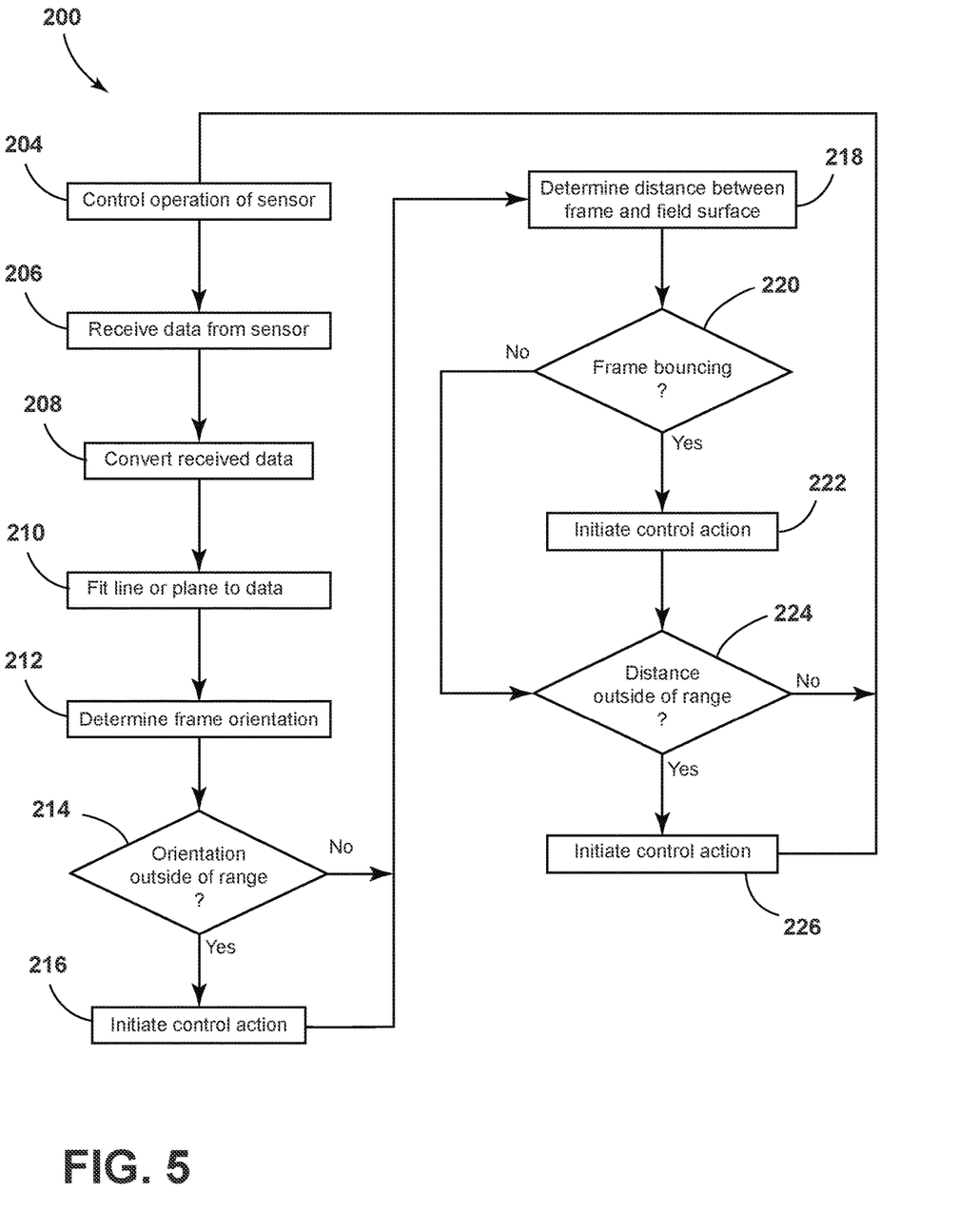
FIG. 5 illustrates a flow diagram providing one embodiment of example control logic for monitoring frame orientation of an agricultural implement in accordance with aspects of the present subject matter.

Referring now to FIG. 5, a flow diagram of one embodiment of example control logic 200 that may be executed by the computing system 116 (or any other suitable computing system) for monitoring frame position of an agricultural implement is illustrated in accordance with aspects of the present subject matter. Specifically, the control logic 200 shown in FIG. 5 is representative of steps of one embodiment of an algorithm that can be executed to monitor frame position of an agricultural implement in a manner that allows for a more accurate and quicker determination of frame orientation requiring fewer computing resources and/or less processing time. However, in other embodiments, the control logic 200 may be used in association with any other suitable system, application, and/or the like for monitoring frame orientation of an agricultural implement.

As shown in FIG. 5, at (204), the control logic 200 includes controlling the operation of a sensor such that the sensor emits output signals for reflection off of a field surface. Specifically, as described above, the computing system 116 is communicatively coupled to the sensor 102 via the communicative link 118. Thus, in several embodiments, as the implement/vehicle 10/12 travels across a field (e.g., to perform an agricultural operation thereon), the computing system 116 may transmit control signals to the sensor 102 via the communicative link 118. The control signals, in turn, instruct the sensor 102 to emit output signals (e.g., the output signals 104 in FIGS. 2 and 3) for reflection off of a field surface (e.g., the field surface 106 in FIGS. 2 and 3). In such embodiments, a. portion of each output signal is reflected off of the field surface at a different location. For example, the sensor 102 may emit the output signals such there is an angular spacing between each signal (e.g., 0.25 degrees) such that the output signals are reflected at differing locations along a swath of the field surface extending in the longitudinal and/or lateral directions 30, 36, Furthermore, at (206), the control logic 200 includes receiving data indicative of the plurality of return signal(s) detected by the sensor. More specifically, as described above, the sensor 102 detects the reflections of the output signals as return signals (e.g., the return signals 108 in FIGS. 2 and 3). In this respect, the implement/vehicle 10/12 travels across a field, the computing system 116 may receive data from the sensor 102. via the communicative link 118. Such data may generally be indicative of one or more parameters associated with the reflected output signals and/or detected return signals, such as the distances between the sensor 102 and portions of the field surface off of which the output signals are reflected and the angles at which the output signals are reflected from the sensor 102.

Additionally, at (208), the control logic 200 includes converting the received data into Cartesian coordinates. Specifically, the data received at (204) may be in polar coordinates. For example, each data point may correspond to a distance (e.g., the distance from the sensor to the field surface) and an angle (e.g., the angle at which the corresponding output signal was emitted). As such, in several embodiments, the computing system 116 may convert the data received from the sensor 102 at (204) from polar coordinates to Cartesian coordinates. In this respect, the converted data is indicated of the position in X and Y coordinates of the field surface relative to the sensor 102. Thus, each converted data point has a horizontal position (e.g., a position along the swath being scanned) and a vertical position (e.g., a distance from the sensor in the vertical direction).

Moreover, at (210), the control logic 200 includes fitting a line or plane the received data. Specifically, in several embodiments, the computing system 116 may fit a line or plane to the data received at (206) and converted at (208). For example, the computing system 116 may fit a line 2D data and a plane to 3D data. As will be described below, the fitted line or plane is used to determine the position of the implement frame 28 (e.g., its orientation or the height/distance from the field surface). some embodiments, the computing system 116 may fit a straight or linear line or a flat plane to the data. However, in alternative embodiments, the computing system 116 may fit any other suitable type of line or plane to the data.

Figure 6:
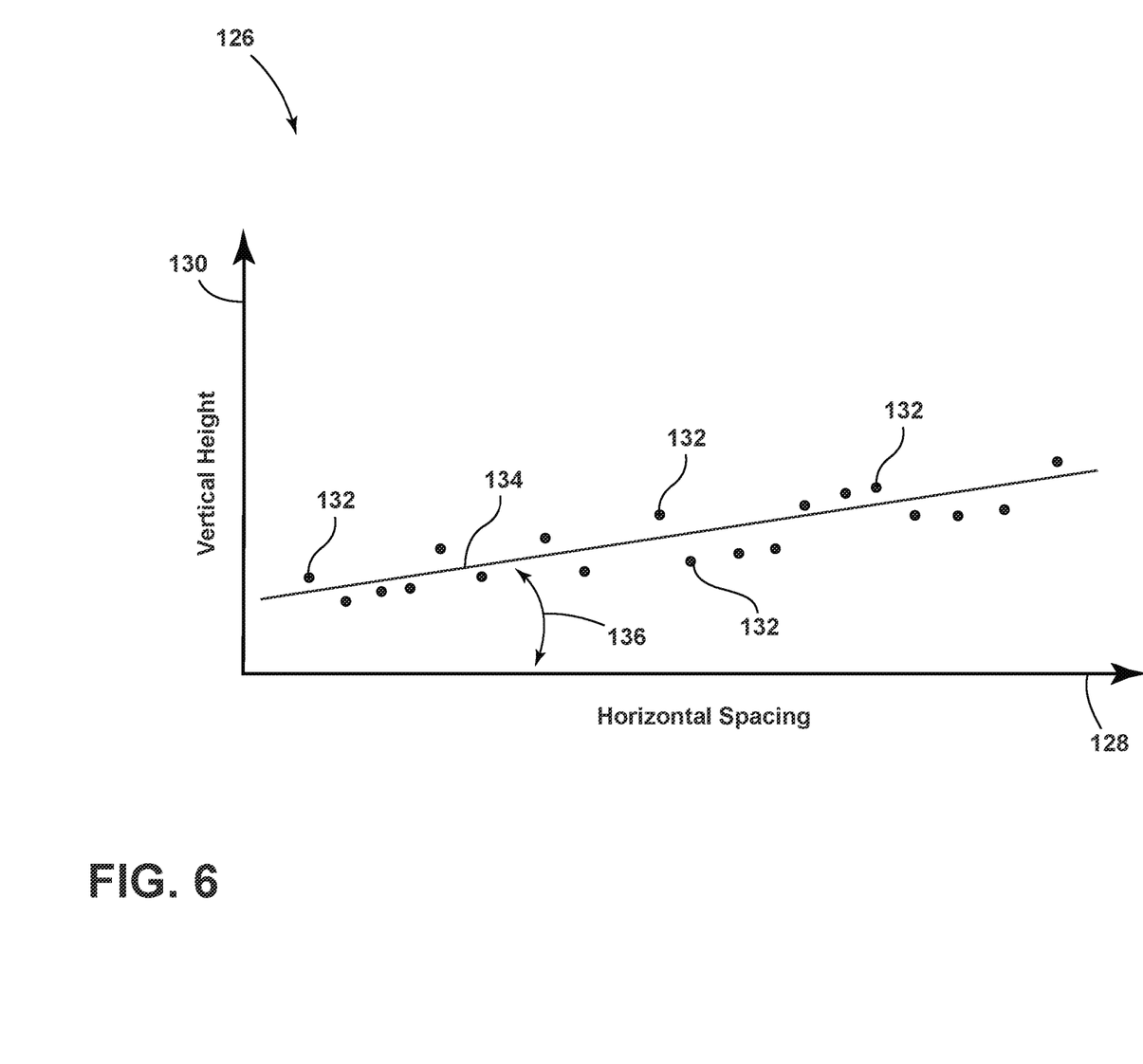
FIG. 6 is an example graphical view of a line fitted to data received from a sensor when monitoring frame orientation of an agricultural implement in accordance with aspects of the present subject matter.
Figure 7:
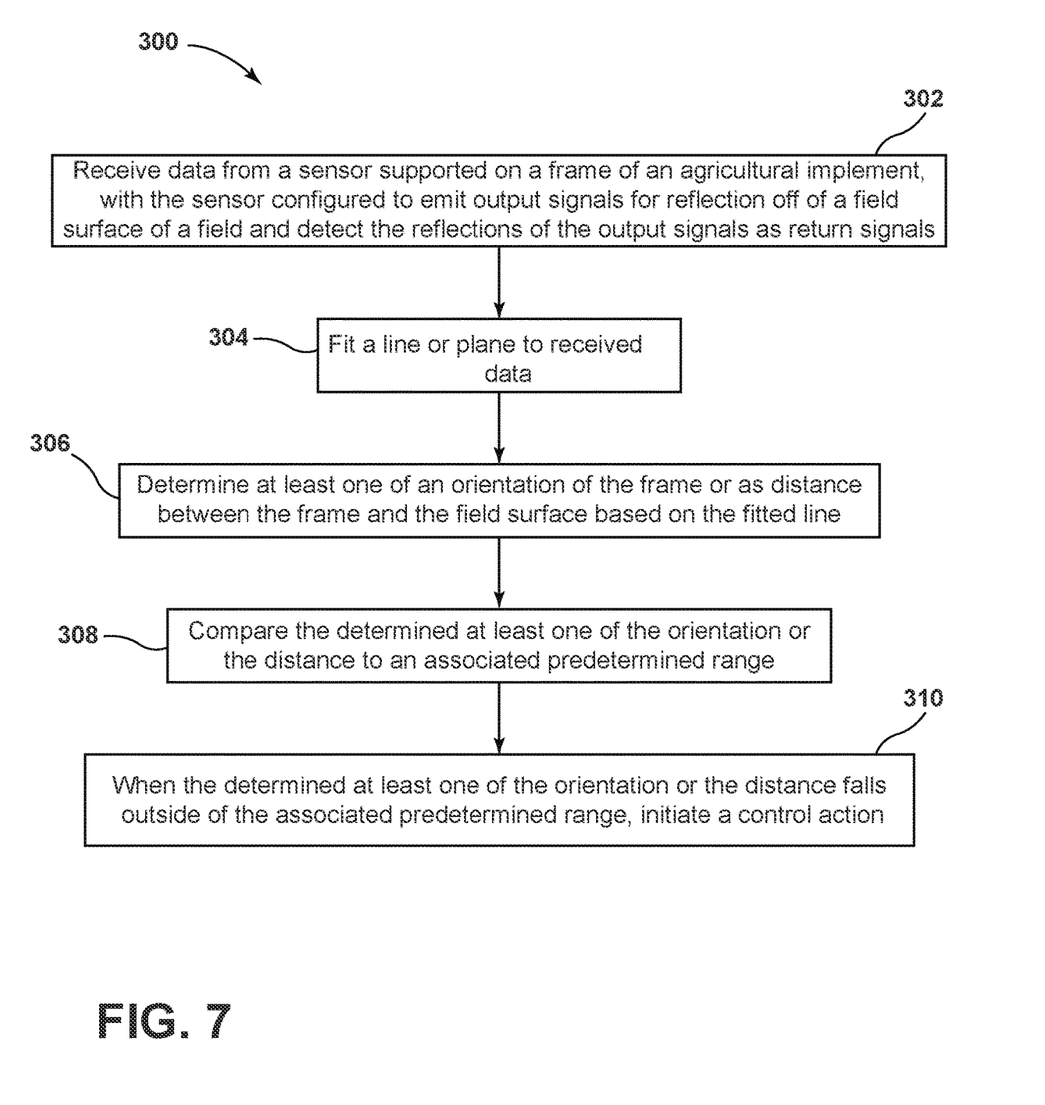
FIG. 7 illustrates a flow diagram of one embodiment of a method for monitoring frame orientation of an agricultural implement in accordance with aspects of the present subject matter.

FIG. 6 illustrates an example graphical view of a chart 126 of the data that has been converted at (208). Specifically, the chart 126 indicates horizontal position or spacing on a horizontal axis 128 and vertical position on a vertical axis 128. In this respect, each data 132 on the chart 126 has an associated horizontal position (e.g., the position along the scanned swath of the field in the horizontal direction) and an associated vertical position (e.g., the distance from the sensor). As shown, a line 134 has been fitted to data points 132. The line 134 is, in turn, indicative of the average profile of the field surface relative to the horizontal axis of the implement 10.

Referring again to FIG. 5, at (212), the control logic 200 includes determining the frame orientation of an agricultural implement based on the fitted line or plane. Specifically, in several embodiments, the computing system 116 determines the orientation of the implement frame 28 relative to the field surface based on the fitted line or plane. For example, the computing system 116 may determine the value of the angle defined between the fitted line and the horizontal axis of the implement frame 28 (e.g., as indicated by arrow 136 in FIG. 6). Such angle is, in turn, indicative of the orientation of the frame 28 relative to the field surface.

The frame orientation determined at (212) may correspond to any suitable parameter indicative of the orientation of the frame relative to the field surface. For example, in some embodiments, the determined frame orientation may correspond to a roll of the frame (e.g., a roll angle) and/or a pitch of the frame (e.g., a pitch angle). The use of a fitted line may allow the computing system 116 to determine one dimension of the frame orientation (e.g., pitch or roll). Conversely, the use of a fitted plane may allow the computing system 116 to simultaneously determine two dimensions of the frame orientation (e.g., pitch and roll)

Furthermore, at (214), the control logic 200 includes comparing the determined orientation of the frame to an associated predetermined range. Specifically, in several embodiments, the computing system 116 may compare the orientation determined at (212) to an associated predetermined range of orientations. When that the determined orientation of the frame 28 is within the associated range, the frame 28 may have generally level orientation such that the tools (e.g., the disks 52, the shanks 54, and/or the leveling blades 56) on the implement 10 form a seedbed of uniform depth. In such instances, the control logic 200 proceeds to (218). Conversely, when that the determined orientation of the frame 28 falls outside of the associated range, the frame 28 may have generally non-level orientation (e.g., a rolled or pitched orientation) such that the tools on the implement 10 form a seedbed of varying depth. The frame 28 may have a non-level orientation due a flat tire, a tire pressure differential across the implement 10, varying field conditions across the implement 10 (e.g., soil moisture, soil hardness, etc.) and/or the like. In such instances, the control logic 200 proceeds to (216).

Moreover, at (216), the control logic 200 includes initiating a. control action. Specifically, in several embodiments, when it is determined at (214) that the orientation of the frame 28 is outside of the associated range, the computing system 116 may initiate one or more control actions.

For example, in some embodiments, such control action(s) may include providing a notification to the operator of the implement 10 indicating that the determined orientation of the implement frame 28 has fallen outside of the predetermined range of orientations. Specifically, when it is determined at (214) that the orientation of the frame 28 is outside of the associated range, the computing system 116 may transmit control signals to the user interface 124 via the communicative link 118. Such control signals, in turn, instruct the user interface 124 to display a visual notification and/or emit an audible notification to the operator indicating that the determined orientation of the implement frame 28 has fallen outside of the predetermined range of orientations. Thereafter, the operator can perform any suitable control action that the operator believes is necessary to adjust the orientation of the frame 28 (e.g., checking and adjusting tire pressure).

Additionally, or as an alternative thereto, the control action(s) may include actively adjusting the operation of one or more components of the implement 10 and/or the vehicle 12. For example, in one embodiment, the control action(s) may include adjusting the position of a wheel(s) (not shown) relative to the implement frame 28. In such an embodiment, the computing system 116 may transmit control signals to the wheel actuator(s) 112 via the communicative link 118. The control signals, in turn, instruct the wheel actuator(s) 112 to adjust the position of the associated wheel relative to the frame 28. Such an adjustment may move the frame 28 back to a generally level orientation.

In another embodiment, the control action(s) may include adjusting the position of a first section (not shown) of the implement frame 28 relative to a second section (not shown) of the implement frame 23. In such an embodiment, the computing system 116 may transmit control signals to the frame actuator(s) 114. The control signals, in turn, instruct the frame actuator(s) 114 to adjust the relative positioning of the first and second frame sections. Such an adjustment may move the frame 28 back to a generally level orientation.

In alternative embodiments, the control action(s) may include adjusting the operation of any other suitable component(s) of the implement and/or the vehicle 12, For example, in one embodiment, the control action(s) may include adjusting the penetration depth of one or more of the tools (e.g., the disks 52, the shanks 54, and/or the leveling blades 56) supported on the implement frame 28.

Furthermore, at (218), the control logic 200 includes determining the height of the frame or the distance between the frame and the field surface. Specifically, in several embodiments, the computing system 116 determines the distance between the implement frame 28 and the field surface based on the fitted line or plane. For example, the computing system 116 may determine the distance between a center point on the fitted line or plane and the sensor. Such angle is, in turn, indicative of the height of the frame 28 or the distance between the frame 28 and the field surface.

Additionally, in some embodiments, the computing system 116 may be configured to determine the when the implement frame 28 is bouncing relative to the field surface based on the determined height of the implement frame 28. For example, when the height of the implement frame 28 is changing quickly and/or cyclically, the implement frame 28 may be bouncing. In this respect, the computing system 116 may compare several successive distance/height determinations. When such successive distance/height determinations vary by more than a predetermined amount, the computing system 116 may determine that the frame 28 is bouncing. When the frame 28 is bouncing, the control logic 200 proceeds to (222). Conversely, when the frame 28 is not bouncing, the control logic 200 proceeds to (224).

Moreover, at (222), the control logic 200 includes initiating a control action. Specifically, in several embodiments, when it is determined at (214) that the orientation of the frame 28 is outside of the associated range, the computing system 116 may initiate one or more control actions. For example, such control action(s) may include providing a notification and/or adjusting the relative positioning of component(s) as described above at (216).

In addition, such control action(s) may include adjusting the operation of one or more other sensors positioned on the implement 10 and/or the vehicle 12. For example, the computing system 116 may adjust the camera frame(s) of the camera(s) 125 such that camera(s) 125 capture images within the same frame as the implement 10 bounces. More specifically, the camera(s) 125 capture images relative to coordinate system of the frame 28 of the implement 10 where the camera(s) 125 are mounted. As such, the images need to be transformed to the coordinate system of the ground plane of the field. Because the implement 10 is bouncing, there is not a fixed relationship between the coordinate system of the implement frame 28 and the coordinate system of the ground plane. In this respect, the measurement orientation and offset that is determined between the implement frame 28 and the ground plane as described above can be used to transform images to the ground plane coordinate system. Thus, subsequent images captured over a time interval can be compared, summed, averaged, and/or the like because all of the images are expressed relative to the ground plane coordinate system even though the camera(s) 125 itself is mounted to a bouncing frame. Such stabilization techniques can be applied to other types of sensors mounted on the frame 28.

Furthermore, at (224), the control logic 200 includes comparing the determined distance between the frame and field surface to an associated predetermined range. Specifically, in several embodiments, the computing system 116 may compare the distance determined at (218) to an associated predetermined range of distances. When that the determined orientation of the frame 28 is outside the associated range, the frame 28 may be too high or too low relative to the field surface such that the penetration depths of the tools (e.g., the disks 52, the shanks 54, and/or the leveling blades 56) on the implement 10 are too depth or too shallow. In such instances, the control logic 200 proceeds to (226). Conversely, when that the determined orientation of the frame 28 is within of the associated range, the height of the frame 28 may be such that the penetration depths of the tools (e.g., the disks 52, the shanks 54, and/or the leveling blades 56) on the implement 10 are the desired depth. In such instances, the control logic 200 returns to (204).

Moreover, at (226), the control logic 200 includes initiating a control action. Specifically, in several embodiments, when it is determined at (224) that the distance is outside of the associated range, the computing system 116 may initiate one or more control actions. Such control action(s) may include any of the control actions described above.

Referring now to FIG. 6, a flow diagram of one embodiment of a method 300 for monitoring frame position of an agricultural implement is illustrated in accordance with aspects of the present subject matter. In general, the method 300 will be described herein with reference to the agricultural implement 10, the associated work vehicle 12, and the system 100 described above with reference to FIGS. 1-5. However, it should be appreciated by those of ordinary skill in the art that the disclosed method 300 may generally be implemented with any agricultural implement having any suitable implement configuration, with any work vehicle having any suitable vehicle configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, data from a sensor supported on a frame of an agricultural implement, with the sensor configured to emit output signals for reflection off of a field surface of a field and detect reflections of the output signals as return signals. For instance, as described above, the computing system 116 may receive data from the sensor 102 supported on the frame 28 of the agricultural implement 10. The sensor 102 is, in turn, configured to emit output signals (e.g., the output signals 104 in FIGS. 2 and 3) for reflection off of a field surface (e.g., the field surface 106 in FIGS. 2 and 3) and detect the reflections of the output signals as return signals (e.g., the return signals 108 in FIGS. 2 and 3).

Additionally, at (304), the method 300 include fitting, with the computing system, a line or plane to the received data. For instance, as described above, the computing system 116 may fit a line (e.g., a straight line) or plane (e.g., a flat plane) to the received data.

Moreover, as shown in FIG. 6, at (306), the method 300 include determining, with the computing system, at least one of the orientation of the frame or the distance between the frame and the field surface based on the fitted. For instance, as described above, the computing system 116 may determine the orientation of the frame 28 (e.g., its pitch and/or roll) of the implement 10 and/or the distance between the frame 28 and field surface based on the fitted line or plane.

Furthermore, at (308), the method 300 include comparing, with the computing system, the determined at least one of the orientation of the frame or the distance between the frame and the field surface to a predetermined associated range. For instance, as described above, the computing system 116 may compare the determined orientation of the frame 28 to a predetermined range of orientations and/or compare the determined distance between the frame 28 and the field surface to a predetermined range of distances.

In addition, at (310), when the determined at least one of the orientation or the distance falls outside of the associated predetermined range, the method 300 includes initiating, with the computing system, a control action. For instance, as described above, when the determined orientation and/or distance falls outside of the associated predetermined range, the computing system 116 may initiate a control action(s) associated with adjusting the position of the frame (e.g., by the controlling the operation of the wheel and/or frame actuator(s) 112, 114 to adjust the orientation of the frame 28 and/or adjusting the frame(s) of the camera(s) 125).

It is to be understood that the steps of the control logic 200 and the method 300 are performed by the computing system 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 116 described herein, such as the control logic 200 and the method 300, is implemented in software code or instructions which are tangibly stored on a tangible computer readable medium. The computing system 116 loads the software code or instructions via a direct interface with the computer readable medium or via a wired and/or wireless network. Upon loading and executing such software code or instructions by the computing system 116, the computing system 116 may perform any of the functionality of the computing system 116 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
 a frame extending in a longitudinal direction between a forward end of the frame and an aft end of the frame, the frame further extending in a lateral direction between a first side of the frame and a second side of the frame;

a tool supported on the frame, the tool configured to perform an agricultural operation on a field as the agricultural implement travels across the field;

a sensor supported on the frame, the sensor configured to emit output signals for reflection off of a field surface of the field and detect reflections of the output signals as return signals; and a computing system communicatively coupled to the sensor, wherein the computing system:

receives data associated with the detected reflections from the sensor;

fits a line or plane to the received data; and determines at least one of an orientation of the frame based on the fitted line or plane.

2. The agricultural implement of claim 1, wherein, when determining the orientation, the computing system determines at least one of a roll of the frame or a pitch of the frame.

3. The agricultural implement of claim 1, wherein the tool comprises a ground-engaging tillage tool.

4. A system for monitoring frame position of an agricultural implement, the system comprising:

an implement frame extending in a longitudinal direction between a forward end of the implement frame and an aft end of the implement frame, the implement frame further extending in a lateral direction between a first side of the implement frame and a second side of the implement frame;

a sensor supported on the frame, the sensor configured to emit output signals for reflection off of a field surface of the field and detect reflections of the output signals as return signals; and a computing system communicatively coupled to the sensor, wherein the computing system:

receives data associated with the detected reflections from the sensor;

fits a line or plane to the received data; and determines at least one of an orientation of the implement frame or a distance between the implement frame and the field surface based on the fitted line or plane.

5. The system of claim 4, wherein, when determining the at least one of the orientation or the distance, the computing system determines the orientation of the implement frame.

6. The system of claim 5, wherein, when determining the orientation, the computing system determines an angle defined between the fitted line or plane and a horizontal axis of the implement frame.

7. The system of claim 5, wherein, when determining the orientation, the computing system determines at least one of a roll of the implement frame or a pitch of the implement frame.

8. The system of claim 4, wherein, when determining the at least one of the orientation or the distance, the computing system determines the distance between the implement frame and the field surface.

9. The system of claim 8, wherein, when determining the distance, the computing system determines the distance between a center point of the fitted line or plane and the sensor.

10. The system of claim 8, wherein the computing system determines when the implement frame is bouncing relative to the field surface based on the determined distance.

11. The system of claim 4, wherein the sensor is configured to emit the output signals such that each output signal is reflected off of the field surface at a different location along a swath of the field surface extending in the lateral direction.

12. The system of claim 4, wherein the computing system:

compares the determined at least one of the orientation or the distance to an associated predetermined range; and when the determined at least one of the orientation or the distance falls outside of the associated predetermined range, initiates a control action.

13. The system of claim 12, wherein the control action comprises at least one of adjusting a position of a wheel relative to the implement frame or a position of a first section of the implement frame relative to a second section of the implement frame.

14. The system of claim 12, wherein the control action comprises adjusting a camera frame of a camera supported on the implement frame.

15. The system of claim 5, wherein the sensor comprises a LiDAR sensor.

16. A method for monitoring frame position of an agricultural implement, the agricultural implement including a frame, the method comprising:

receiving, with a computing system, data from a sensor supported on the frame, the sensor configured to emit output signals for reflection off of a field surface of a field and detect reflections of the output signals as return signals;

fitting, with the computing system, a line or plane to the received data;

determining, with the computing system, at least one of an orientation of the frame or a distance between the frame and the field surface based on the fitted line or plane;

comparing, with the computing system, the determined at least one of the orientation or the distance to an associated predetermined range; and when the determined at least one of the orientation or the distance falls outside of the associated predetermined range, initiating, with the computing system, a control action.

17. The method of claim 16, wherein determining the at least one of the orientation or the distance comprises determining, with the computing system, the orientation of the frame.

18. The method of claim 16, wherein determining the at least one of the orientation or the distance comprises determining, with the computing system, the distance between the frame and the field surface.

* * * * *